US008805104B1

(12) United States Patent
Covell et al.

(10) Patent No.: US 8,805,104 B1
(45) Date of Patent: Aug. 12, 2014

(54) SELECTING EXAMPLE-BASED PREDICTORS BASED ON SPATIAL CONTINUITY

(75) Inventors: Michele Covell, Palo Alto, CA (US); Vivek Kwatra, Santa Clara, CA (US); Mei Han, Palo Alto, CA (US); Saurabh Mathur, Sunnyvale, CA (US); Shumeet Baluja, Leesburg, VA (US)

(73) Assignee: Google Inc., Mountain View, CA (US)

( * ) Notice: Subject to any disclaimer, the term of this patent is extended or adjusted under 35 U.S.C. 154(b) by 563 days.

(21) Appl. No.: 13/105,610

(22) Filed: May 11, 2011

(51) Int. Cl.
*G06K 9/36* (2006.01)

(52) U.S. Cl.
USPC ...... 382/238; 382/239; 382/232; 375/240.01; 375/240.12

(58) Field of Classification Search
USPC ......... 382/190, 225, 226, 227, 232, 233, 235, 382/236, 238, 239, 240, 245, 248, 250; 348/384.1, 390.1, 394.1, 395.1, 400.1, 348/409.1, 414.1, 415.1, 417.1, 418.1, 348/420.1, 421.1, 422.1, 430.1, 431.1; 375/240.01, 240.12, 240.14, 240.15, 375/240.16, 240.18, 240.19, 240.2, 240.24
See application file for complete search history.

(56) References Cited

U.S. PATENT DOCUMENTS

| | | | | |
|---|---|---|---|---|
| 6,792,157 | B1 * | 9/2004 | Koshi et al. | 382/251 |
| 8,103,112 | B2 * | 1/2012 | Horie et al. | 382/232 |
| 8,351,721 | B2 * | 1/2013 | Katou et al. | 382/238 |
| 8,515,193 | B1 * | 8/2013 | Han et al. | 382/238 |
| 2010/0254622 | A1 * | 10/2010 | Kamay et al. | 382/239 |
| 2011/0222836 | A1 * | 9/2011 | Nakazato | 386/282 |
| 2012/0250764 | A1 * | 10/2012 | Martin et al. | 375/240.12 |

OTHER PUBLICATIONS

Nuno M. M. Rodrigues et al., "On Dictionary Adaptation for Recurrent Pattern Image Coding", IEEE Transactions on Image Processing, vol. 17, No. 9, Sep. 2008, pp. 1640-1653.*
Cui, J., et al., "Example-Based Image Commpression," 17th IEEE International Conference on Image Processina (ICIP}, 2010, 4 Pages.*
Baluja, S., et al., "Beyond "Near-Duplicates": Learning Hash Codes for Efficient Similar-Image Retrieval" ICPR'10, International Conference on Pattern Recognition, Aug. 20, 2010, pp. 543-547.
Barnes, C., et al., "PatchMatch: A Randomized Correspondence Algorithm for Structural Image Editing," ACM Transactions on Graphics (Proc. SIGGRAPH), Aug. 2009, 10 pages.
Cui, J., et al., "Example-Based Image Commpression," 17th IEEE International Conference on Image Processing (ICIP), 2010, 4 Pages.
Datar, M., et al., "Locality Sensitive Hashing Scheme Based on p-Stable Distributions," SoCG'04, Jun. 9-11, 2004, New York, USA, ACM, 10 Pages.
Grundmann, M., et al., "Efficient Hierarchical Graph-Based Video Segmentation," CVPR, 2010, pp. 1-8.

(Continued)

*Primary Examiner* — Mekonen Bekele
(74) *Attorney, Agent, or Firm* — Young Basile Hanlon & MacFarlane P.C.

(57) ABSTRACT

An image processing system is provided for encoding images based on example-based compression. The system selects a set of candidate dictionary predictor entries to encode a portion of an image based at least in part on the neighbors of the portion. The spatial continuity between portions of the image is exploited by the image processing system by selecting corresponding dictionary predictor entries that have the same offset vector as the portion of the image and its neighboring portions.

20 Claims, 3 Drawing Sheets

(56) References Cited

OTHER PUBLICATIONS

Khan, A., et al., "Content Classification Based on Objective Video Quality Evaluation for MPEG4 Video Streaming over Wireless Networks," Proceedings of the World Congress on Engineering 2009, vol. I WCE 2009, Jul. 1-3, 2009, London, U.K., 6 pages.

Kleinberg, J., et al., "Algorithm Design," Chapter 1, Introduction: Some Representative Problems, Pearson Education Inc., 2006, 13 pages.

MacQueen, J. B., "Some Methods for classification and Analysis of Multivariate Observations," Proceedings of 5-th Berkeley Symposium on Mathematical Statistics and Probability, 1967, Berkeley, University of California Press, vol. 1, pp. 281-297.

Shlens, J., "A Tutorial on Principal Component Analysis-Derivation, Discussion and Singular Value Decomposition," Mar. 25, 2003, PCA-Tutorial-Intuition, Version 1, pp. 1-16, available at <URL:http://www.cs.princeton.edu/picasso/mats/PCA-Tutorial-Intuition_jp.pdf>.

Yianilos, P., "Data Structures and Algorithms for Nearest Neighbor Search in General Metric Spaces," NEC Research Institute Technical Report Fourth, Jun. 1992, 11 pages.

\* cited by examiner

SELECTING EXAMPLE-BASED PREDICTORS BASED ON SPATIAL CONTINUITY

BACKGROUND

1. Field of Art

The present invention generally relates to the field of video compression, and more specifically, to methods of selecting dictionary predictor entries in example-based compression.

2. Background of the Invention

Many current visual compression techniques rely on an encoder to predict the structure of an image or video based on another image, and communicate the predictor-selection information to a decoder. The decoder reconstructs the image using the predictor selector information. Typically, the predictor-selection information is combined with a residual signal to compensate for differences between the reconstructed image and the original image, thereby bringing each part of the reconstructed image into closer alignment with the original image.

For example, the H.264 standard for video compression predicts the structure of each macroblock of a given frame using motion fields from other reference frames. By limiting the number of reference frames (typically 1-8 frames) and the number of distinct offsets available within each reference frame (typically 100-1,000 offsets), the encoder can search through available predictions to select one that will be best, in terms of compression rate and rate-distortion.

In example-based compression, the compression technique also uses predictor-selection and transmission to encode an image or video. However, compared to H.264 and other modern video codecs, in example-based compression the number of available predictors available to the encoder is much larger than the number of predictors available to other video codecs. Typically, a dictionary used in example-based compression may comprise a massive collection of predictors on the order of millions rather than thousands. Due to the size of the dictionary used in example-based compression, the speed in which current techniques select the best predictor from the dictionary needs improvement.

SUMMARY

An image processing system is provided for encoding images based on example-based compression. The image processing system comprises a database of dictionary predictor entries that are used to encode images. The dictionary predictor entries are whole images or portions of reference images which are used as dictionary predictor entries, or portions thereof, for encoding other images. The dictionary entries may be partitioned into a plurality of dictionaries based on content. Based on the content of an image for encoding, the image processing system selects dictionary predictor entries from an appropriate dictionary in which to encode the image.

The image processing system selects a set of candidate dictionary predictor entries to encode a portion of an image. For each portion of an image to be encoded (target image) the image processing system selects a randomly chosen dictionary predictor entry as a candidate. Based on metadata associated with the image, the image processing system may perform a localized search of the database of dictionary predictor entries for entries associated with content included in the image. The randomly chosen entries are considered initial dictionary predictor entries for the portions of the image.

The image processing system further selects additional candidates for each portion of the image based on spatial locality. A portion of an image to be encoded has a location relative to neighboring portions in the target image. The position of a portion of the target image relative to its neighbors is represented as an offset vector. The offset vector is used to select candidate predictors for encoding the portion of the image. The spatial continuity between portions of the image is exploited by the image processing system by selecting corresponding dictionary predictor entries that have the same offset vector as the portion of the image and its neighbors. For a given portion, the image processing system identifies the initial dictionary predictor entries selected for the neighbors of the portion. As previously discussed above, a dictionary predictor entry may be a portion of a whole image. The image processing system may identify for each portion, a dictionary predictor entry that is located an offset from the initial dictionary predictor entry selected for the neighbor where the offset corresponds to the offset vector between the portion and the neighbor.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
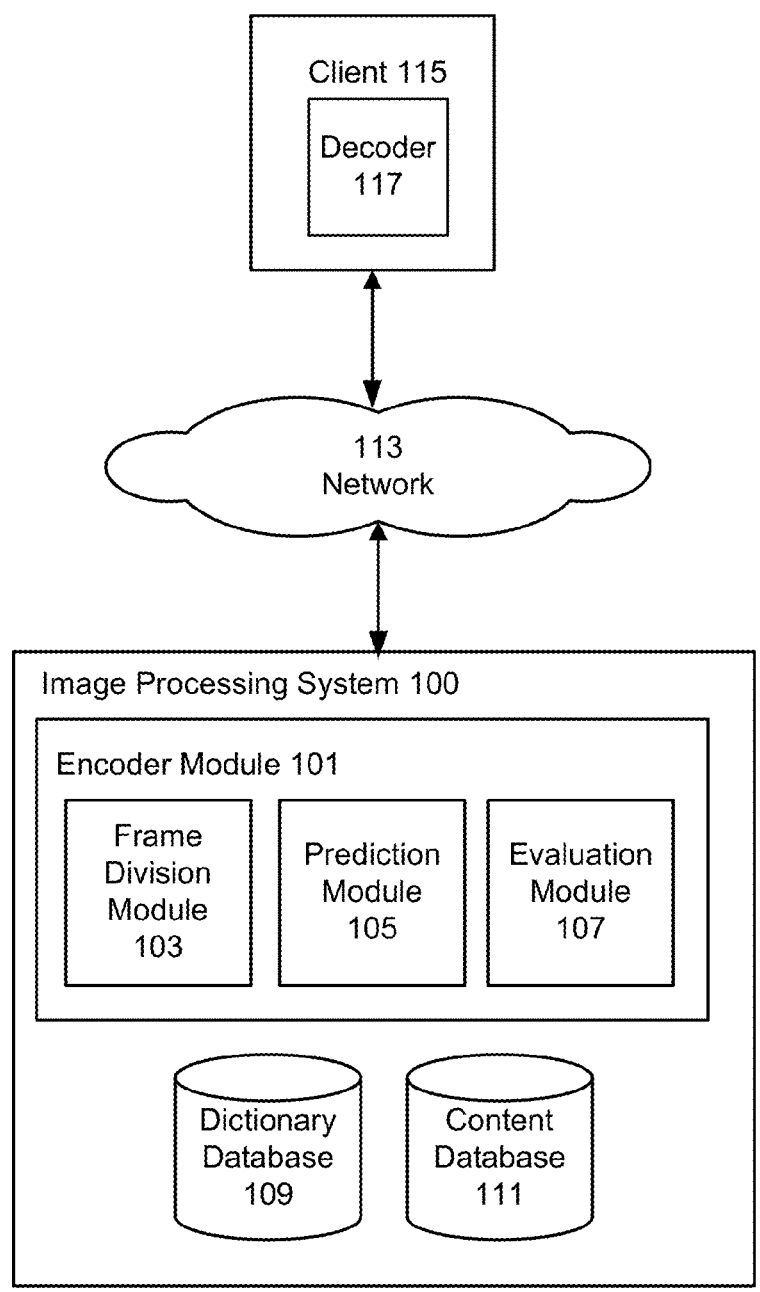
FIG. 1 is a high-level block diagram of an image processing system in accordance with one embodiment.

FIG. 1 is a high-level block diagram illustrating a detailed view of an image processing system 100 for encoding frames of images or videos using example-based compression. Generally, a target frame for encoding is divided into macroblocks where each macroblock is individually encoded using a dictionary predictor entry from an example-based dictionary. The example based dictionary can comprise a single dictionary or a plurality of dictionaries where each dictionary is associated with a particular subject matter. Each dictionary includes dictionary predictor entries associated with the subject matter. A dictionary predictor entry may be a whole image or a portion of an image. Due to the size of the dictionary, selection of the dictionary prediction entries used for encoding can be a time consuming process. To improve the encoding process, the image processing system 100 exploits the natural spatial relationship between macroblocks within the target frame in order to select dictionary predictor entries used to encode the macroblocks of the target frame. By selecting candidate dictionary predictor entries for a macroblock of the target frame based on the spatial continuity between the macroblock and its neighboring macroblocks, the speed of the encoding process is improved.

In one embodiment, a client 115 executing a decoder 117 is in communication with the image processing system 100 via a network 113 such as the Internet or any combination of a LAN, a MAN, a WAN, a mobile, wired or wireless network, a private network, or a virtual private network. While only a single client 115 is shown in FIG. 1, in general very large numbers (e.g., millions) of clients are supported and can be in communication with the image processing system 100 at any time. The client 115 can be implemented using any of a variety of different computing devices, some examples of which are personal computers, digital assistants, personal digital assistants, cellular phones, mobile phones, smart phones and laptop computers. In one embodiment, the client 115 receives content such as images or videos from the image processing system 100. The decoder 117 decodes (i.e., reconstructs) image or videos using dictionary information provided by the image processing system 100.

As shown in FIG. 1, the image processing system 100 comprises an encoder module 101, a dictionary database 109, and a content database 111. Other modules and/or databases may be included in the image processing system 100 in other embodiments.

The content database 111 stores content for encoding (i.e., compression). The term content as employed herein includes image data in general, such as individual still image files or frames of images from a video file. In the discussion herein, the term frame may describe a target image which is encoded by the image processing system 100 as well as portions of the target frame. Each frame may be associated with metadata describing the frame. For example, the metadata may include tags describing the substance (i.e., content) of the frame, the video associated with the frame, an author of the content or other descriptive information. This information may be used to select candidate dictionary predictor entries for encoding the frame.

The content in the content database 111 may be obtained from a variety of sources, such as from an organization producing professional images or videos. Likewise, images and videos may be obtained from users, e.g. as submitted by a user uploading images to a photo repository such as PICASA WEB, or a video repository such as YOUTUBE or GOOGLE VIDEO.

The dictionary database 109 stores example-based dictionaries used to encode frames of content from the content database 111. In one embodiment, the dictionary database 109 stores a plurality of example-based dictionaries where each dictionary is associated with a particular type of content. The type of content may be enumerated with respect to the subject matter of the content, source of the content, or author of the content, or any combination of thereof. For example, the dictionary database 109 may comprise a beach dictionary associated with beach images, a building dictionary associated with images of buildings or urban environments, and a vehicle dictionary associated with images of vehicles, etc. Images for each subject matter dictionary can be manually curated or selected automatically based on analysis of metadata such as keywords, tags, title, as well as automated image analysis and object recognition methods.

Each dictionary may then be further organized into sub-dictionaries based on sub-classes of the subject matter of content associated with the dictionary. For example, the vehicle dictionary may include sub-dictionaries for automobiles and motorcycles, and then into further sub-dictionaries by manufacturer. By organizing the dictionaries based on content, the selection of dictionary predictor entries to encode a target frame is improved since the selection may be localized to a specific dictionary based on the content of the target frame.

Each dictionary in the dictionary database 109 comprises dictionary predictor entries. A dictionary predictor entry may comprise of an image. In other words, the images constituting the dictionary entries may comprise whole images. Alternatively, a dictionary predictor entry may comprise an image patch that is formed from a smaller portion (i.e., regions) or blocks (sub-window) of a whole image. Typical patch sizes can range from 2×2 pixels to 128×128 pixels. Alternatively, a dictionary entry may be a video cube that comprises a plurality of frames that are temporally related to one another, for example a set of 30 frames over a 2 second period, at 15 fps. In one embodiment, the dictionary entries may be indexed into tables of a relational database, although other database schemes may be used to store the dictionary entries.

Figure 2A:
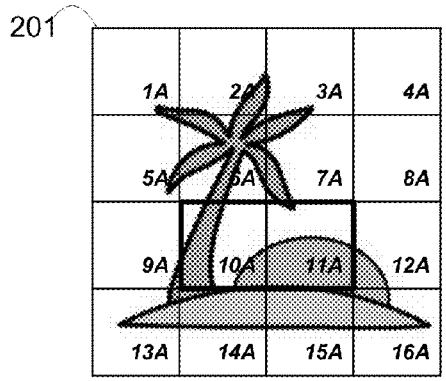
FIGS. 2A and 2B illustrate dictionary entries for use as candidate dictionary predictor entries and FIG. 2C illustrates a target frame for encoding using the dictionary entries in accordance with one embodiment.
Figure 2B:
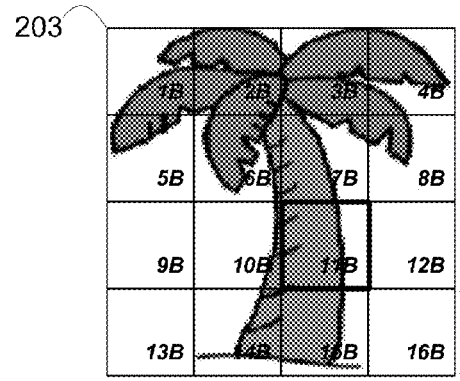

Referring now to FIG. 2A and FIG. 2B, there is shown a schematic example of plurality of dictionary predictor entries that collectively represent images 201 and 203 respectively. For example, image 201 is represented by a plurality of dictionary predictor entries 1A through 16A. Image 203 is similarly represented by a plurality of dictionary predictor entries 1B through 16B. Each dictionary predictor entry for an image is a portion or block of the image. The example dictionary predictor entries illustrated in FIGS. 2A and 2B represent beach scenes within a beach dictionary.

Referring back to FIG. 1, the encoder module 101 encodes frames of content from the content database 111. The encoder module 101 encodes the frames using example-based dictionary predictor entries selected from the dictionary database 109. After one or more dictionary predictor entries are selected to encode a target frame, the encoder module 101 may communicate the selected dictionary entry information to the decoder 117 in order for the decoder 117 to decode (i.e. reconstruct) the image using the information.

In one embodiment, the encoder module 101 comprises a frame division module 103, a prediction module 105, and an evaluation module 107. Although not illustrated in FIG. 1, the encoder module 101 may include other modules that are used to perform the encoding process of a target frame as is known in the art of example-based encoding. Additionally, the encoder module 101 may include other modules other than those illustrated in FIG. 1.

Figure 2C:
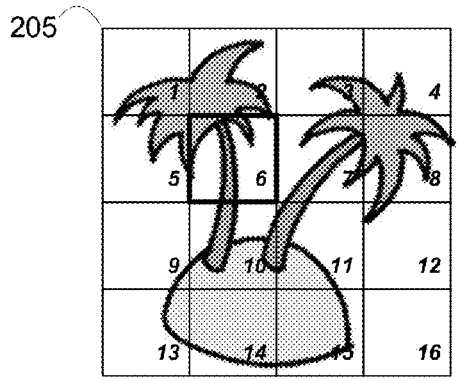

The frame division module 103 divides frames of content in the content database 111 into macroblocks. Each macroblock may be 16×16 pixels in size but other sizes may be used in alternative embodiments. Specifically, for each frame, the frame division module 103 divides the frame into a grid of macroblocks (blocks or portions) which are separately encoded by the encoder 101. FIG. 2C illustrates an example of a target frame 205 which has been divided into a plurality of macroblocks. As shown in FIG. 2C, target frame 205 is divided into 16 macroblocks by the frame division module 103.

For each macroblock of an image, the frame division module 103 identifies the macroblock's neighbors. In one embodiment, the neighbors of a given macroblock are the macroblocks that are directly adjacent to the block in the horizontal, vertical, and diagonal directions. For most macroblocks the frame division module 103 identifies eight spatial neighbor macroblocks. However, the frame division module 103 identifies only three or five neighbors for the macroblocks that are respectively located at the corners of a frame or at one of the non-corner edge regions of the frame. For each macroblock, the frame division module 103 establishes a list of the macroblock's neighbors and their spatial offset within the frame, relative to a given block.

In one embodiment, the neighbor list indicates the pair offset vectors for each of a given macroblocks neighbors. Specifically, each offset vector in the list describes a normalized position of a neighbor relative to a given macroblock in the horizontal (x) and vertical (y) directions. The normalized (unit) position is representative of the offset vector or distance between anchor points (origins) of a pair of blocks. For example, the anchor points of a pair of macroblocks may be located 16 pixels from one another in both the positive x and y directions. The normalized offset representing the location of a neighbor relative to the macroblock in this example is (1, 1) which represents an offset of (16, 16).

Consider an example for identifying a list of neighbors for macroblock 13 in FIG. 2C. The location of macroblock 13 is associated with the bottom left corner of the image 205. Accordingly, the frame division module 103 identifies the list of three offset vectors for this macroblock to identify macroblocks 9, 10, and 14 as neighbors of macroblock 13.

In one embodiment, to establish a list of neighbors for each macroblock within an image, the frame division module 103 assigns a class indication to each macroblock indicative of the macroblock's position within the image. The indication describes whether the macroblock is an interior block, a corner block, or a border block based on the macroblock's position within the image. In one embodiment, a corner block is a macroblock located at the corners of the image. In FIG. 2C, macroblocks 1, 4, 13, and 16 are considered as corner blocks. In contrast, a border block is a macroblock located at the perimeter (boundary) of the image that is not a corner of the image. In FIG. 2C, macroblocks 2, 3, 5, 8, 9, 12, 14, and 15 are border blocks. Lastly, an interior block is a macroblock located at a position within the image that is not at the perimeter or corner of the image. For example, in FIG. 2C macroblocks 5, 7, 10, and 11 are interior blocks.

For each corner block, the frame division module 103 may also indicate whether the block is located at the top-left corner, bottom-left corner, top-right corner, or bottom-right corner of the image. Similarly, for each non-corner border block, the frame division module 103 may indicate whether the block is located at the left border, right border, top border, or bottom border of the image. Sub-classes of corner and border blocks are identified as the neighbors of corner blocks and border blocks vary based on sub-class.

In one embodiment, the list of neighbors is identified based on the following list of offset vectors:

$$O_j = (\text{offset\_}x_j, \text{offset\_}y_j) \text{ where } j \geq 1;$$

The above list indicates the offset vectors in the horizontal (x) and vertical (y) directions of a given macroblocks neighbors. The value of j indicates a particular neighbor of a given macroblock. Based on macroblock's position within an image, the amount of neighbors may vary. Thus, the list shown above is a general representation of the list of offset vectors of a macroblock's neighbors. The following lists of offset vectors indicates one embodiment of the lists of offset vectors based on the different types of macroblocks described previously:

OI$_j$={(−1, 1), (0, 1), (1, 1), (−1, 0), (1, 0), (−1, −1), (0, −1), and (1, −1)} where OI$_j$ represents a list of offset vectors of neighbors of an interior block and j=1→8;

OLB$_j$={(0, 1), (1, 1), (1, 0), (1, −1), and (0,−1)} where OLB$_j$ represents a list of offset vectors of neighbors of a left border block and j=1→5;

ORB$_j$={(0, 1), (−1, 1), (−1, 0), (−1, −1), and (0,−1)} where ORB$_j$ represents a list of offset vectors of neighbors of a right border block and j=1→5;

OTB$_j$={(−1, 0), (1, 0), (−1, −1), (0, −1), and (1, −1)} where OTB$_j$ represents a list of offset vectors of neighbors of a top border block and j=1→5;

OBB$_j$={(−1, 0), (1, 0), (−1, 1), (0, 1), and (1, 1)} where OBB$_j$ represents a list of offset vectors of neighbors of a bottom border block and j=1→5;

OTLC$_j$={(1, 0), (1, −1), and (0, −1)} where OTLC$_j$ represents a list of offset vectors of neighbors of a top left corner block and j=1→3;

OBLC$_j$={(0, 1), (1, 1), and (0, 1)} where OBLC$_j$ represents a list of offset vectors of neighbors of a bottom left corner block and j=1→3;

OTRC$_j$={(−1, 0), (−1, −1), and (0, −1)} where OTRC$_j$ represents a list of offset vectors of neighbors of a top right corner block and j=1→3; and OBRC$_j$={(−1, 0), (−1, 1), and (0, 1)} where OBRC$_j$ represents a list of offset vectors of neighbors of a bottom right corner block and j=1→3;

Each list of offset vectors indicates pairs of unit value (normalized) offsets that describe the location of a given macroblock's neighbors relative to the location of the macroblock based on the macroblock's class. From the list of offset vectors, the frame division module 103 identifies the list of neighbors for each macroblock based on the macrolocks position within the image.

Referring back to FIG. 1, the prediction module 105 selects candidate dictionary predictor entries from the dictionary database 109 to encode target frames from the content database 111. Specifically, for each macroblock within a target frame (i.e., an image), the prediction module 105 assigns (i.e., selects) a set of candidate dictionary predictor entries to encode the macroblock. From the set of candidates for the given macroblock, the prediction module 105 selects a single dictionary predictor entry to encode the macroblock. In one embodiment, the prediction module 105 selects dictionary predictor entries as candidates to encode a given macroblock until a time threshold is met and/or a quality threshold in terms of compression and rate-distortion is met.

A given macroblock ($T_i$) is represented by a set of coordinates (x, y) that correspond to the anchor point of the block. In one embodiment, the set of candidate dictionary predictor entries (C) for the macroblock ($T_i$) is represented according to the variables below:

IPT$_i$=initial (or previous iteration) dictionary predictor for $T_i$;

IPT$_{Oj}$=initial (or previous iteration) dictionary predictor for neighbor $T_{Oj}$ of $T_i$;

In one embodiment, an initial predictor entry is a dictionary predictor entry that was randomly chosen from the dictionary database 109 to encode a macroblock as will be described in further detail below. The relationships of the above factors to each other in an exemplary embodiment is represented by the following:

$$C = \{IPT_i \ldots (IPT_{Oj} + O_j)\}$$

wherein:

IPT$_i$=dictionary predictor entry ($D_{n,a}$) where a is a position (x, y) in image n;

IPT$_{Oj}$=dictionary predictor entry ($D_{m,b}$) where b is a position (x, y) in image m; and $O_j$=(offset x, offset y)=an offset from the list of neighbors for macroblock $T_i$;

In the above equation, the set of candidate dictionary predictor entries (C) for macroblock $T_i$ comprises the initial dictionary predictor entry (IPT$_i$) selected for macroblock T$_i$ and a plurality of spatial dictionary predictor entries (IPT$_{Oj}$+O$_j$) that are chosen based on the initial dictionary predictor entries selected for the neighbors (T$_{Oj}$) of T$_i$. In one embodiment, a spatial dictionary predictor entry for macroblock T$_i$ is located at an offset O$_j$ from the location of the initial dictionary predictor (IPT$_{Oj}$) entry selected for the neighbor T$_{Oj}$. The offset Oj is selected based on the corresponding offset vector from the neighbor T$_{Oj}$ to macroblock T$_i$ as indicated in the list of offsets vectors previously described above. Note that the index j is indicative of a corresponding neighbor of macroblock T$_i$ and ranges from 1 to 8 depending on the class of macroblock T$_i$.

Alternatively, the set of candidate dictionary predictor entries for macroblock T$_i$ can be further expanded to consider candidates that derive from the initial set of candidates by some further spatial offset vector ($\pm\Delta_s x, \pm\Delta_s y$), in addition to the already indicated O$_j$. The additional offset vectors can be selected to correspond to a simple grid search of offsets or a coarse-to-fine style grid of offsets.

The initial dictionary predictor entry for macroblock T$_i$ (IPT$_i$) is a dictionary predictor entry (D$_{n,a}$) from the dictionary database 109 where n references the image associated with the entry and a references a specific sub-block of the image. For example, n may correspond to image 203 shown in FIG. 2B and a references a particular sub-block (e.g., 11B) from image 203. Particularly, a may correspond to the position of the sub-block in terms of x and y coordinates. Unlike the macroblocks in the target image, the sub-block positions used within the prediction image need not correspond to an integer multiple of the macroblock size. Similarly, the initial dictionary predictor entry (IPT$_{Oj}$) for the neighbor T$_{Oj}$ of macroblock T$_i$ is a dictionary entry (D$_{m,b}$) from the dictionary database 109 where m references the image associated with the entry and b references a specific sub-block of the image in terms of x and y coordinates. For example, m may correspond to image 201 shown in FIG. 2A and b is associated with a sub-block (e.g., 6A) from image 201. Note that image n and image m may or may not correspond to the same image.

In one embodiment, to select an initial dictionary predictor entry (IPT$_i$) for a macroblock (T$_i$) of a target frame, the prediction module 105 performs a pseudo-random search of the dictionary database 109. The prediction module 105 searches the dictionary database 109 for the initial dictionary predictor entry to encode the macroblock for evaluation purposes. Note that the prediction module 105 may simultaneously identify the initial dictionary predictor entry for each macroblock of the target frame or may sequentially identify the initial dictionary predictor entry for each macroblock. Note that the prediction module 105 may perform a number of pseudo-random searches initial predictor entries for macroblock T$_i$. Thus, the initial dictionary prediction entry may represent a previous initial dictionary prediction entry identified in a previous search.

Because the target frame is associated with metadata describing the content of the frame, the prediction module 105 randomly selects the initial dictionary predictor entry from an appropriate dictionary in the dictionary database 109 based on the content of the frame. The prediction module 105 may select the initial dictionary predictor entry based on a metadata match. As described previously, each dictionary entry may comprise metadata describing the image associated with the entry. Based on the metadata, the prediction module 105 may locate a dictionary from the dictionary database 109 that comprises entries associated with the content of the target frame. For example, if the target frame includes content about beaches, the prediction module 105 searches the beach dictionary for entries.

As mentioned previously, the prediction module 105 selects spatial dictionary predictor entries as candidates to encode the macroblock T$_i$. Spatial dictionary predictor entries are dictionary predictor entries that are selected by the prediction module 105 based on the spatial relationship between macroblock T$_i$ and its neighboring macroblocks T$_{Oj}$ in the target frame. As described above, the neighbors T$_{Oj}$ of a given macroblock in a target frame are the macroblocks that are directly adjacent to the macroblock T$_i$ in the horizontal, vertical, and diagonal directions.

Macroblocks encoded using spatial dictionary predictor entries selected from the example-based dictionaries share a natural spatial relationship with the dictionary entries due to the macroblocks corresponding spatial locality within the dictionary entries. For example, consider neighboring macroblocks 1 and 6 in target frame 205 with their origins (i.e., anchor points) represented as the pixel locations of top-left corners of the macroblocks. The location (L) of the origins of the macroblocks are separated from each other by a horizontal shift of x pixels, and a vertical shift of y pixels, representing an offset vector from macroblock 1 to macroblock 6. Thus, the location (L$_6$) of the origin of macroblock 6 may be represented as:

$$L_6 = O_1 + (\text{offset\_}x, \text{offset\_}y) = (x_1, y_1) + (\text{offset\_}x, \text{offset\_}y)$$

As noted previously, dictionary predictor entries may be sub-blocks of an image. Thus, if some sub-block at an offset (offset_x, offset_y) from the origin of a dictionary entry is selected as the dictionary predictor entry for a given macroblock at location, then by spatial continuity, the dictionary predictor entry (i.e., a sub-block of the image) at a position P$_j$=P$_i$+(offset_x, offset_y) is potentially a good dictionary predictor entry for the macroblock.

Thus, the prediction module 105 may exploit spatial continuity by selecting for a macroblock, spatial dictionary predictor entries based on the offset vectors of the macroblock and its neighbors. In other words, for each target macroblock within the target frame, the prediction module 105 collects a set of spatial dictionary predictor entries for evaluation based on the offset vectors for the macroblock and its neighboring blocks.

To select the spatial dictionary predictor entries for the macroblock (T$_i$) based on the neighboring macroblocks (T$_{Oj}$), the prediction module 105 identifies the initial dictionary predictor entry previously selected for each of the macroblock's neighbors. That is, the prediction module 105 identifies the initial dictionary predictor entry (IPT$_{Oj}$) that was randomly selected to encode each of the macroblock's neighbors (T$_{Oj}$). Because predictor entries may be sub-blocks of an image, the prediction module 105 identifies as the spatial dictionary predictor entries for the macroblock, a sub-block of the image that is located a distance from the initial dictionary predictor entry for the neighbor that is equivalent to the offset vector (O$_j$) for the macroblock (Ti) and the neighbor (T$_{Oj}$). Thus, for each neighbor (T$_{Oj}$), the prediction module 105 identifies a corresponding spatial dictionary predictor entry for the macroblock (Ti) based on the offset vector (O$_j$) for the macroblock (T$_i$) and its neighbor (T$_{Oj}$) and the initial dictionary predictor entry selected for the neighbor (IPT$_{Oj}$).

The evaluation module 107 evaluates the resulting compression of macroblocks of target images using the candidate dictionary predictor entries selected by the prediction module 105. To evaluate the compression of a macroblock, the evaluation module 107 compares the quality of compression resulting from each candidate entry to a quality threshold in terms of compression and rate-distortion. Based on the comparison, the evaluation module 107 identifies a candidate dictionary predictor entry that will be used to encode the macroblock. If the comparison results in a quality below the quality threshold, the evaluation module 107 may communicate with the prediction module 105 to select additional candidate dictionary predictor entries for the given macroblock based on the spatial dictionary predictor entries of the macroblock's neighbors.

In one embodiment, to improve the speed of the encoding process, the evaluation module 107 prunes the total number of candidates considered for each macroblock of the target image. The evaluation module 107 may only consider spatial dictionary predictor entries that yielded an evaluation above a threshold value for the neighbor macroblock itself. That is, a spatial dictionary predictor entry is selected as a candidate if the initial dictionary predictor for the neighbor from which the spatial entry was identified results in an evaluation above the threshold value for the neighbor macroblock. This allows the evaluation module 107 to identify or learn the set of candidate dictionary predictor entries for the region of the image that result in a compression that is above the threshold value (i.e. good compression). Additionally, if the spatial candidate dictionary predictor entries already result in an evaluation above the threshold, the evaluation module 107 may communicate with the prediction module 105 to abort (i.e., stop) the search of the dictionary database 109 for additional candidate dictionary predictor entries even though the time threshold has not been met.

Rather than transmitting an explicit dictionary index and spatial offset to a decoder 117 to reconstruct the image using the selected dictionary predictor entries, the evaluation module 107 may communicate a mode bit and a selector index to the decoder. In one embodiment, the mode bit indicates to the decoder 117 that the predictor is a spatial dictionary predictor entry and the selector index indicates which of the neighbors is the basis for the spatial candidate. Because the decoder 117 is aware of the offset vectors between macroblocks of a target image, the decoder can identify the dictionary predictor entry knowing only the neighbor that formed the basis of the selection of the dictionary entry.

In one embodiment, the selector index may either be a simple index indicating the neighbor of each block, or the selector index may denote the rank of the neighbor within an ordering of the neighbors of the block. The rank may be indicative of the quality of the encoding using the entries based on the neighbor. Because the selector index is much smaller than a global dictionary index, the speed of the decoding process is improved.

Method of Dictionary Predictor Entry Selection

Figure 3:
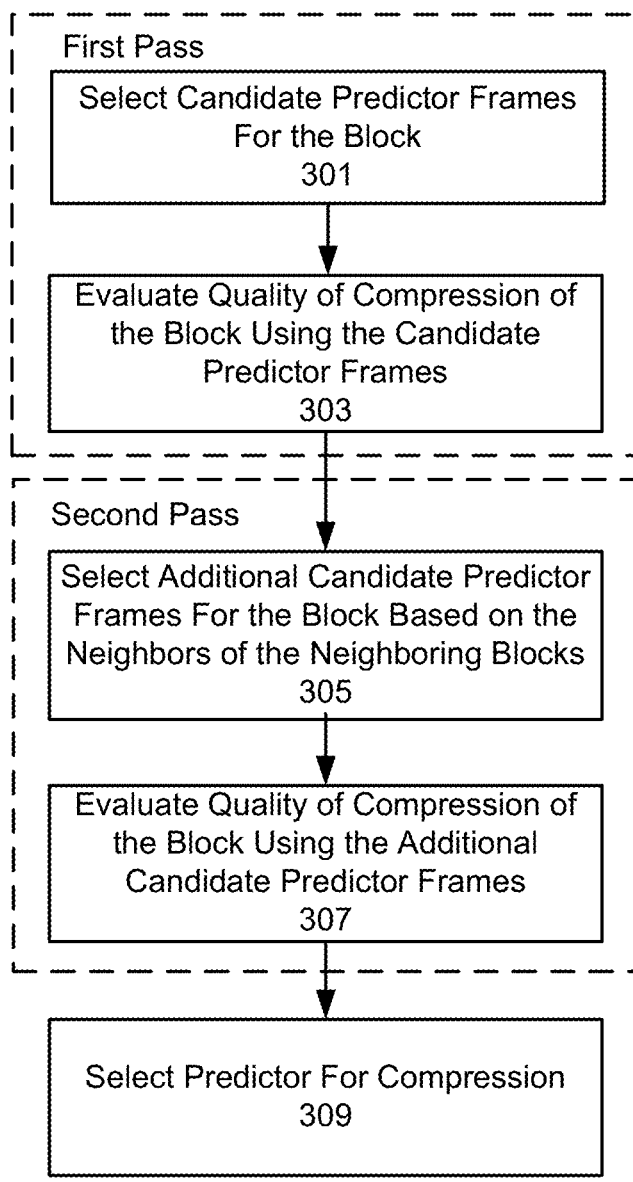
FIG. 3 illustrates steps performed by an image processing server to select dictionary predictor entries to encode an image in accordance with one embodiment.

FIG. 3 is one embodiment of a method performed by the image processing system 100 to select a dictionary predictor entry for encoding a macroblock of an image. Other embodiments perform the illustrated steps in different orders, and/or perform different or additional steps.

The image processing system 100 performs one or more passes in which it selects candidate dictionary predictor entries to encode the macroblock of the image. Although only two passes are shown in the embodiment illustrated in FIG. 3, additional passes may be performed by the image processing system 100 to select a dictionary predictor entry to encode the macroblock in other embodiments.

During the first pass, the image processing system 100 selects 301 candidate dictionary predictor entries for the macroblock. The image processing system 100 selects an initial dictionary predictor entry as a candidate to encode the macroblock by performing a pseudo-random search of the dictionary database 109 based on the content of the target frame associated with the macroblock. For example, consider an example of selecting a dictionary predictor entry for encoding macroblock 6 of target frame 205 shown in FIG. 2C. Given that target frame 205 illustrates a beach scene, the image processing system 100 performs a search of a beach dictionary and randomly selects an initial candidate dictionary predictor entry from the beach dictionary. For example, the image processing system 100 may select dictionary predictor entry 11 corresponding to image 203 shown in FIG. 2B as the initial dictionary predictor entry to encode macroblock 6 of the target frame 205.

Additionally, the image processing system 100 selects candidate spatial dictionary predictor entries for the macroblock. The selection of the spatial dictionary predictor entries is based on the initial candidate dictionary predictor entries selected for the macroblock's neighbors. For the macroblock and each of its neighbors, the image processing system 100 identifies the offset vector between an anchor point of the macroblock to an anchor point of the neighbor. In one embodiment, the anchor point may be represented by the center of the macroblock/neighbor or may be located at the top left corner of the macroblock/neighbor or at other locations. In the example shown in FIG. 2C, macroblocks 1, 2, 3, 4, 7, 9, 10, and 11 are considered the neighbors of macroblock 6. Accordingly, the image processing system 100 identifies the offset vectors between the target macroblock and each of its neighbors.

Because of spatial continuity between blocks, the image processing system may select spatial dictionary predictor entries for the target macroblock based on the identified offset vectors for the macroblock relative to its neighbors. The image processing system 100 may select a spatial dictionary predictor entry for the target macroblock that is located a distance from the initial dictionary predictor entry for the neighbor according to the offset vector. For each of the neighbors of the target macroblock, the image processing system 100 identifies a spatial dictionary predictor entry based on the initial dictionary predictor entry selected for the neighbor and the offset vector between the target macroblock and the neighbor.

For example, consider target macroblock 6 of image 205 whose neighbor is macroblock 7. The image processing system 100 identifies for example the offset vector of 16 pixels in the horizontal direction and 0 pixels in the vertical direction (i.e., offset (16, 0)) for macroblock 6 and macroblock 7. In other words, the target block 6 is located 16 pixels to the left of macroblock 7. When encoding block 7, the image processing system 100 may have identified dictionary predictor entry 11 of image 201 shown in FIG. 2A as the initial dictionary predictor entry for block 7 of target frame 205. Accordingly, the image processing server 100 selects the dictionary predictor entry located 16 pixels to the left of dictionary predictor entry 11 of image 201 (i.e., the distance of the offset vector) as a suitable dictionary predictor entry for target macroblock 6 due to spatial continuity. In this example, dictionary predictor entry 10 of dictionary predictor entry 201 may be considered as a spatial candidate to encode macroblock 6 of the target frame 205. The image processing server 100 repeats this process for each of target macroblock 6's neighboring blocks.

Referring back to FIG. 3, the image processing server 100 evaluates 303 the quality of the compression of the target macroblock using the selected candidate dictionary predictor entries. To evaluate the quality, the image processing server 100 determines the compression and rate-distortion resulting from encoding the target block with the initial candidate dictionary predictor entry and the spatial candidate dictionary predictor entries. In one embodiment, to improve the speed in which the target block is encoded, the image processing server 100 may prune the total number of candidate dictionary predictor entries for the target block. The image processing server 100 may only evaluate spatial candidate dictionary predictor entries for those candidates whose associated initial candidate dictionary predictor entries resulted in a quality of encoding above a threshold value for the neighbor itself.

In one embodiment, the image processing server 100 may perform an optional second pass to identify alternative dictionary predictor entries to encode the target macroblock. The image processing server 100 may perform the second pass in response to the quality of the compression using the identified candidates during the first pass being below a quality threshold and/or if there is still time remaining to identify predictors for the target macroblock. However, the second pass may not be performed by the image processing server 100 if the spatial candidate dictionary predictor entries already yield a quality encoding.

During the second pass, the image processing server 100 selects 305 additional candidate dictionary predictor entries for the target block based on the neighbors of the neighbors of the target macroblock according to similar steps performed during the first pass described above. Alternatively, the image processing server 100 may perform another pseudo-random search of the dictionary database 109 for candidates. The image processing server 100 evaluates 307 the quality of the compression of the target macroblock using the additional candidate dictionary predictor entries.

Based on the quality of the compression of the target block using the identified candidates, the image processing server 100 selects 309 a dictionary predictor entry for encoding the target macroblock from the candidate dictionary predictor entries identified during steps 301 and 305. The image processing server 100 may select the dictionary predictor entry that results in the best quality in terms of compression and rate-distortion according to one embodiment. The image processing server 100 may then notify the decoder 117 of the selected predictor in which to decode the target frame.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as determining or displaying or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

As illustrated in FIG. 1, the image processing system 100 comprises various modules. As is known in the art, the term module refers to computer program logic utilized to provide the specified functionality. Thus, a module can be implemented in hardware, firmware, and/or software. In one embodiment, program modules are stored on a storage device, loaded into memory, and executed by a computer processor or can be provided from computer program products (e.g., as computer executable instructions) that are stored in non-transitory computer-readable storage mediums (e.g., RAM, hard disk, or optical/magnetic media). Additionally, those of skill in the art will recognize that other embodiments of the image processing system 100 shown in FIG. 1 can have different and/or other modules than the ones described here, and that the functionalities can be distributed among the modules in a different manner.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method, comprising:
  identifying, by a device comprising a processor, an image to encode, the image comprising a plurality of portions that collectively represent the image;
  selecting, from dictionary predictor entries, one or more dictionary predictor entries to encode a portion of the image, the selection being based at least in part on spatial locality of the portion of the image relative to one or more neighboring portions of the image, the one or more neighboring portions being directly adjacent to the portion of the image;

encoding the portion of the image using the one or more dictionary predictor entries to generate encoded information;

evaluating quality of the encoding using the one or more dictionary predictor entries; and selecting one of the one or more dictionary predictor entries based on the quality of the encoding, wherein the selecting the one or more dictionary predictor entries to encode the portion of the image comprises:

identifying, for a randomly selected dictionary predictor entry, a spatial dictionary predictor entry associated with a reference image that corresponds to the randomly selected dictionary predictor entry, the spatial dictionary predictor entry being positioned within the reference image at an offset vector from a position of the randomly selected dictionary predictor entry within the reference image, and the offset vector being equivalent to a vector between the portion of the image and at least one of the one or more neighboring portions.

2. The method of claim 1, wherein the dictionary predictor entries are stored in one or more example-based dictionaries.

3. The method of claim 2, wherein at least one of the one or more example-based dictionaries is associated with defined subject matter and the dictionary predictor entries stored in the one or more example-based dictionaries are portions of reference images that comprise content associated with the defined subject matter of the one or more example-based dictionaries.

4. The method of claim 1, further comprising:
dividing the image into the plurality of portions that collectively represent the image; and
identifying sets of the one or more neighboring portions for respective ones of the plurality of portions.

5. The method of claim 3, further comprising:
identifying the defined subject matter associated with the content of the image;
identifying an example-based dictionary of the one or more example-based dictionaries, wherein the example-based dictionary comprises dictionary predictor entries corresponding to the defined subject matter; and
randomly selecting a dictionary predictor entry from the identified example-based dictionary to encode the one or more neighboring portions.

6. The method of claim 5, wherein the selecting the one or more dictionary predictor entries to encode the portion of the image further comprises:
identifying the randomly selected dictionary predictor entry for the one or more neighboring portions; and
identifying the reference image, wherein the reference image corresponds to the randomly selected dictionary predictor entry.

7. The method of claim 1, wherein the quality of the encoding is based at least in part on rate distortion.

8. The method of claim 1, further comprising:
selecting additional dictionary predictor entries to encode the image based at least in part on one or more spatial locations of portions of the image, wherein the one or more spatial locations are directly adjacent to the one or more neighboring portions.

9. A non-transitory computer-readable storage medium storing executable code that, in response to execution, cause a device to perform operations comprising:

identifying an image to encode, the image comprising a plurality of portions that collectively represent the image;

selecting, from dictionary predictor entries, one or more dictionary predictor entries to encode a portion of the image, the selection being based at least in part on spatial locality of the portion of the image relative to one or more neighboring portions of the image, the one or more neighboring portions being directly adjacent to the portion of the image;

encoding the portion of the image using the one or more dictionary predictor entries to generate encoded information;

evaluating quality of the encoding using the one or more dictionary predictor entries; and selecting one of the one or more dictionary predictor entries based on the quality of the encoding, wherein the selecting the one or more dictionary predictor entries to encode the portion of the image comprises:

identifying, for a randomly selected dictionary predictor entry, a spatial dictionary predictor entry associated with a reference image that corresponds to the randomly selected dictionary predictor entry, the spatial dictionary predictor entry being positioned within the reference image at an offset vector from a position of the randomly selected dictionary predictor entry within the reference image, and the offset vector being equivalent to a vector between the portion of the image and at least one of the one or more neighboring portions.

10. The non-transitory computer-readable storage medium of claim 9, wherein the dictionary predictor entries are stored in one or more example-based dictionaries.

11. The non-transitory computer-readable storage medium of claim 10, wherein at least one of the one or more example-based dictionaries is associated with defined subject matter and the dictionary predictor entries stored in the one or more example-based dictionaries are portions of reference images that comprise content associated with the defined subject matter of the one or more example-based dictionaries.

12. The non-transitory computer-readable storage medium of claim 9, wherein the operations further comprise:
dividing the image into the plurality of portions that collectively represent the image; and
identifying sets of the one or more neighboring portions for respective ones of the plurality of portions.

13. The non-transitory computer-readable storage medium of claim 11, wherein the operations further comprise:
identifying the defined subject matter associated with the content of the image;
identifying an example-based dictionary of the one or more example-based dictionaries, wherein the example-based dictionary comprises dictionary predictor entries corresponding to the defined subject matter; and
randomly selecting a dictionary predictor entry from the identified example-based dictionary to encode the one or more neighboring portions.

14. The non-transitory computer-readable storage medium of claim 13, wherein the selecting the one or more dictionary predictor entries to encode the portion of the image further comprises:
identifying the randomly selected dictionary predictor entry for the one or more neighboring portions; and identifying the reference image, wherein the reference image corresponds to the randomly selected dictionary predictor entry.

15. An apparatus, comprising:
a processor; and
a non-transitory computer-readable storage medium storing executable code that, in response to execution by the processor, cause the apparatus to perform operations comprising:
- identifying an image to encode, the image comprising a plurality of portions that collectively represent the image;
- selecting, from dictionary predictor entries, one or more dictionary predictor entries to encode a portion of the image, the selection being based at least in part on spatial locality of the portion of the image relative to one or more neighboring portions of the image, the one or more neighboring portions being directly adjacent to the portion of the image;
- encoding the portion of the image using the one or more dictionary predictor entries to generate encoded information;
- evaluating quality of the encoding using the one or more dictionary predictor entries; and
- selecting one of the one or more dictionary predictor entries based on the quality of the encoding,
    - wherein the selecting the one or more dictionary predictor entries to encode the portion of the image comprises:
        - identifying, for a randomly selected dictionary predictor entry, a spatial dictionary predictor entry associated with a reference image that corresponds to the randomly selected dictionary predictor entry, the spatial dictionary predictor entry being positioned within the reference image at an offset vector from a position of the randomly selected dictionary predictor entry within the reference image, and the offset vector being equivalent to a vector between the portion of the image and at least one of the one or more neighboring portions.

16. The apparatus of claim 15, wherein the dictionary predictor entries are stored in one or more example-based dictionaries.

17. The apparatus of claim 16, wherein at least one of the one or more example-based dictionaries is associated with defined subject matter and the dictionary predictor entries stored in the one or more example-based dictionaries are portions of reference images that comprise content associated with the defined subject matter of the one or more example-based dictionaries.

18. The apparatus of claim 15, wherein the operations further comprise:
- dividing the image into the plurality of portions that collectively represent the image; and
- identifying sets of the one or more neighboring portions for respective ones of the plurality of portions.

19. The apparatus of claim 17, wherein the operations further comprise:
- identifying the defined subject matter associated with the content of the image;
- identifying an example-based dictionary of the one or more example-based dictionaries, wherein the example-based dictionary comprises dictionary predictor entries corresponding to the defined subject matter; and
- randomly selecting a dictionary predictor entry from the identified example-based dictionary to encode the one or more neighboring portions.

20. The apparatus of claim 19, wherein the operations further comprise:
- identifying the randomly selected dictionary predictor entry for the one or more neighboring portions; and
- identifying the reference image, wherein the reference image corresponds to the randomly selected dictionary predictor entry.

* * * * *

UNITED STATES PATENT AND TRADEMARK OFFICE
CERTIFICATE OF CORRECTION

PATENT NO. : 8,805,104 B1
APPLICATION NO. : 13/105610
DATED : August 12, 2014
INVENTOR(S) : Michele Covell et al.

It is certified that error appears in the above-identified patent and that said Letters Patent is hereby corrected as shown below:

Title page column 2, under item (56), Other Publications, line 4, "Commpression" should be
--Compression--.

Title page column 2, under item (56), Other Publications, line 5, "Processina" should be
--Processing--.

Title page column 2, item (56), under Other Publications delete lines 13 and 14.

Signed and Sealed this
Thirteenth Day of January, 2015

Michelle K. Lee
*Deputy Director of the United States Patent and Trademark Office*